United States Patent
Anand (10) Patent No.: US 7,203,475 B2
(45) Date of Patent: Apr. 10, 2007

(54) MULTIPLE RATE LOCAL OSCILLATION GENERATOR AND APPLICATIONS THEREOF

(75) Inventor: Seema B. Anand, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 373 days.

(21) Appl. No.: 10/958,480

(22) Filed: Oct. 5, 2004

(65) Prior Publication Data

US 2006/0057994 A1 Mar. 16, 2006

Related U.S. Application Data

(60) Provisional application No. 60/609,731, filed on Sep. 14, 2004.

(51) Int. Cl.
*H04B 15/00* (2006.01)
*H04B 1/26* (2006.01)

(52) U.S. Cl. .................... 455/318; 455/313; 455/196.1

(58) Field of Classification Search ................ 455/318, 455/255, 260, 303, 313, 316, 310, 317, 118, 455/196.1; 331/2
See application file for complete search history.

(56) References Cited

U.S. PATENT DOCUMENTS

| | | | |
|---|---|---|---|
| 5,761,615 A * | 6/1998 | Jaffee ......................... 455/314 |
| 6,181,212 B1 * | 1/2001 | Khoini-Poorfard et al. ... 331/16 |
| 6,404,244 B2 * | 6/2002 | Flecheux ..................... 327/115 |
| 6,574,462 B1 * | 6/2003 | Strange ...................... 455/318 |
| 6,816,021 B2 * | 11/2004 | Hahn et al. ................... 331/74 |
| 6,850,749 B2 * | 2/2005 | Soorapanth et al. ......... 455/318 |
| 7,003,274 B1 * | 2/2006 | Olip ........................... 455/260 |
| 2003/0083033 A1 * | 5/2003 | Staszewski et al. ......... 455/323 |
| 2005/0130618 A1 * | 6/2005 | Staszewski et al. ......... 455/255 |

* cited by examiner

*Primary Examiner*—Sonny Trinh
(74) *Attorney, Agent, or Firm*—Garlick Harrison & Markison; Timothy W. Markison (57) ABSTRACT

A local oscillation generator includes a clock circuit, a first divide module, a first mixing module, a second divide module, and a second mixing module. The clock circuit is operably coupled to generate a first clock signal. The first divide module is operably coupled to divide rate of the first clock signal by a first factor to produce a second clock signal. The first mixing module is operably coupled to mix the first clock signal and the second clock signal to produce a first local oscillation. The second divide module is operably coupled to divide rate of the second clock signal by a second factor to produce a third clock signal. The second mixing module is operably coupled to mix the first clock signal and the third clock signal to produce a second local oscillation.

20 Claims, 7 Drawing Sheets

FIG. 3
LO module 74

FIG. 4
LO module 74

FIG. 5
LO module 74

FIG. 8
buffer 141

MULTIPLE RATE LOCAL OSCILLATION GENERATOR AND APPLICATIONS THEREOF

CROSS REFERENCE TO RELATED PATENTS

This invention is claiming priority under 35 USC § 119(e) to a provisionally filed patent application having the same title as the present patent application, a filing date of Sep. 14, 2004, and an application No. of 60/609,731.

BACKGROUND OF THE INVENTION

1. Technical Field of the Invention

This invention relates generally to wireless communication systems and more particularly to local oscillation generators of wireless communication devices operating in such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

For direct conversion receivers and transmitters (i.e., those that convert RF signals to baseband signals, and vice versa, directly), the local oscillation has a frequency that substantially matches the frequency of the RF signals and is generated by a single local oscillation generator (LOGEN). Typically, the LOGEN will include a phase locked loop (PLL) that converts a reference clock to a higher frequency clock signal, which may be directly used as the local oscillation or manipulated to produce the local oscillation. For example, the PLL may produce a clock signal that is approximately ⅔rds the rate of the RF signals. The PLL clock signal may then be divided by 2 to produce a second clock signal that is approximately $\frac{1}{3}^{rd}$ the rate of the RF signals. The ⅔rds clock signal and the $\frac{1}{3}^{rd}$ clock signal are combined to produce a local oscillation that has a rate corresponding to the RF signals.

In many wireless applications, the RF signals may be conveyed in different channels within different frequency bands. For example, in an IEEE 802.11a application, the frequency bands include 5.15 to 5.35 GHz and 5.725 to 5.825 GHz. Each of these frequency bands supports multiple 20 MHz bandwidth channels. As such, to select a particular channel within a particular frequency band, the local oscillation is adjusted accordingly. For a PLL based LOGEN, the PLL is adjusted to produce the adjusted local oscillation.

As is known, a PLL has a limited range over which it can be accurately adjusted. Thus, for accommodating the frequency bands of a particularly wireless application (e.g., 802.11a) the PLL performs well. However, when a transceiver is a multi-mode transceiver (e.g., one that is compliant with multiple wireless standards) and the frequency bands are substantially different from standard to standard (e.g., 2.4 GHz for 802.11b and 5.25 GHz for 802.11a), the PLL does not have sufficient range to accurately accommodate both standards. As such, a multi-mode transceiver includes two, or more, local oscillation generators: one for a first standard (e.g., 802.11a), another for a second standard (e.g., 802.11b), etc.

When the transceiver is implemented primarily on an integrated circuit, the extra local oscillation generates consumes die area and power. For battery powered devices and/or handheld mobile devices, the never-ending goal is power reduction and size reduction. Thus, the multiple LOGENs are an impediment to achieving smaller integrated circuits and reduced power consumption.

Therefore, a need exists for a method and apparatus for generating multiple local oscillations for a single local oscillation generator.

BRIEF SUMMARY OF THE INVENTION

The multiple rate local oscillation generator and applications thereof of the present invention substantially meet these needs and others. In one embodiment, a local oscillation generator includes a clock circuit, a first divide module, a first mixing module, a second divide module, and a second mixing module. The clock circuit is operably coupled to generate a first clock signal. The first divide module is operably coupled to divide rate of the first clock signal by a first factor to produce a second clock signal. The first mixing module is operably coupled to mix the first clock signal and the second clock signal to produce a first local oscillation. The second divide module is operably coupled to divide rate of the second clock signal by a second factor to produce a third clock signal. The second mixing module is operably coupled to mix the first clock signal and the third clock signal to produce a second local oscillation.

In another embodiment, a local oscillation generator includes a clock circuit, a first divide module, a second divide module, and an adjustable mixing module. The clock circuit is operably coupled to generate a first clock signal. The first divide module is operably coupled to divide rate of the first clock signal by a first factor to produce a second clock signal. The second divide module is operably coupled to divide rate of the second clock signal by a second factor to produce a third clock signal. The adjustable mixing module is operably coupled to mix the first clock signal and the second clock signal to produce a first local oscillation in a first mode of the adjustable mixing module and to mix the first clock signal and the third clock signal to produce a second local oscillation in a second mode of the adjustable mixing module.

DETAILED DESCRIPTION OF THE INVENTION

Figure 1:
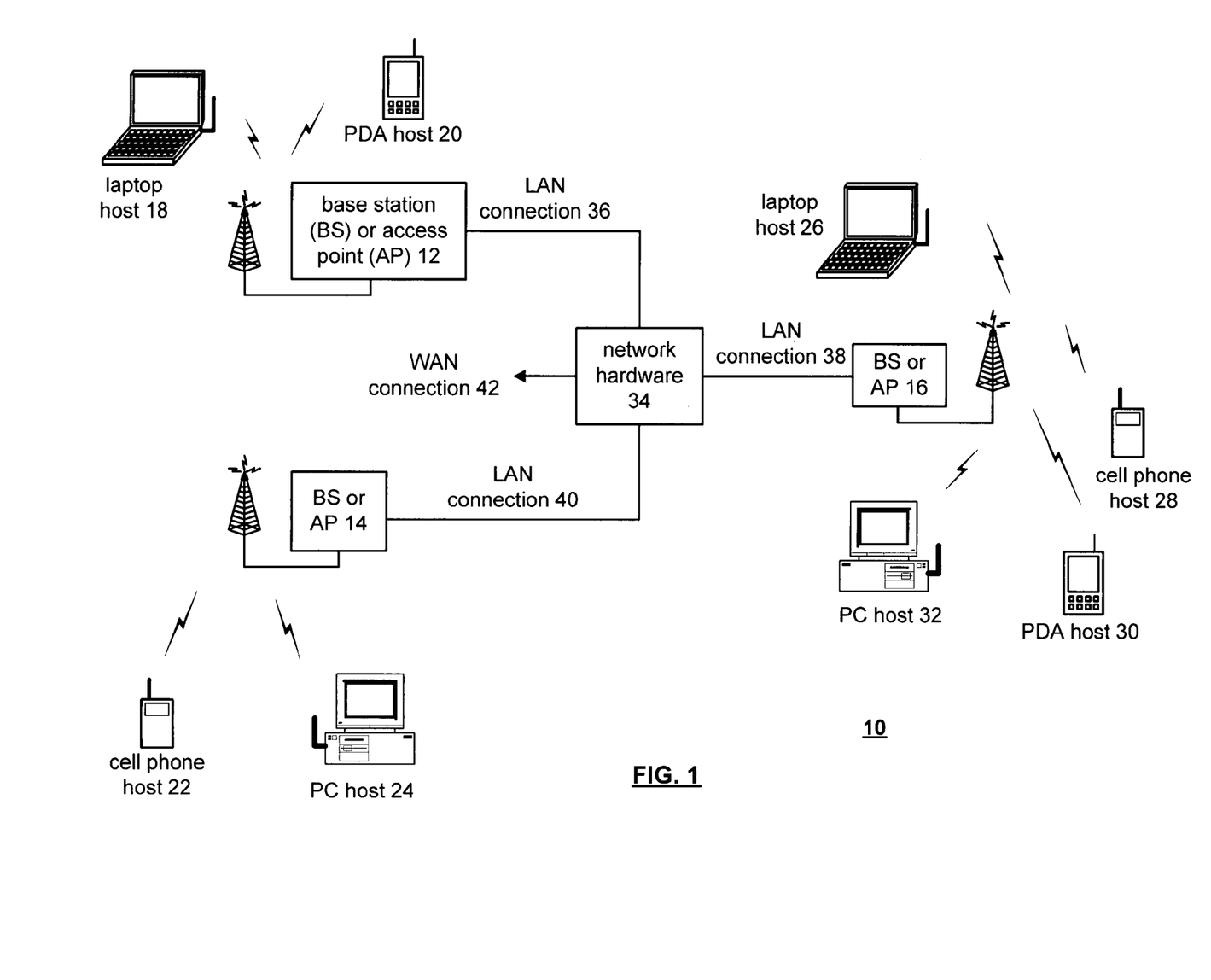
FIG. 1 is a schematic block diagram of a wireless communication system in accordance with the present invention.

FIG. 1 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
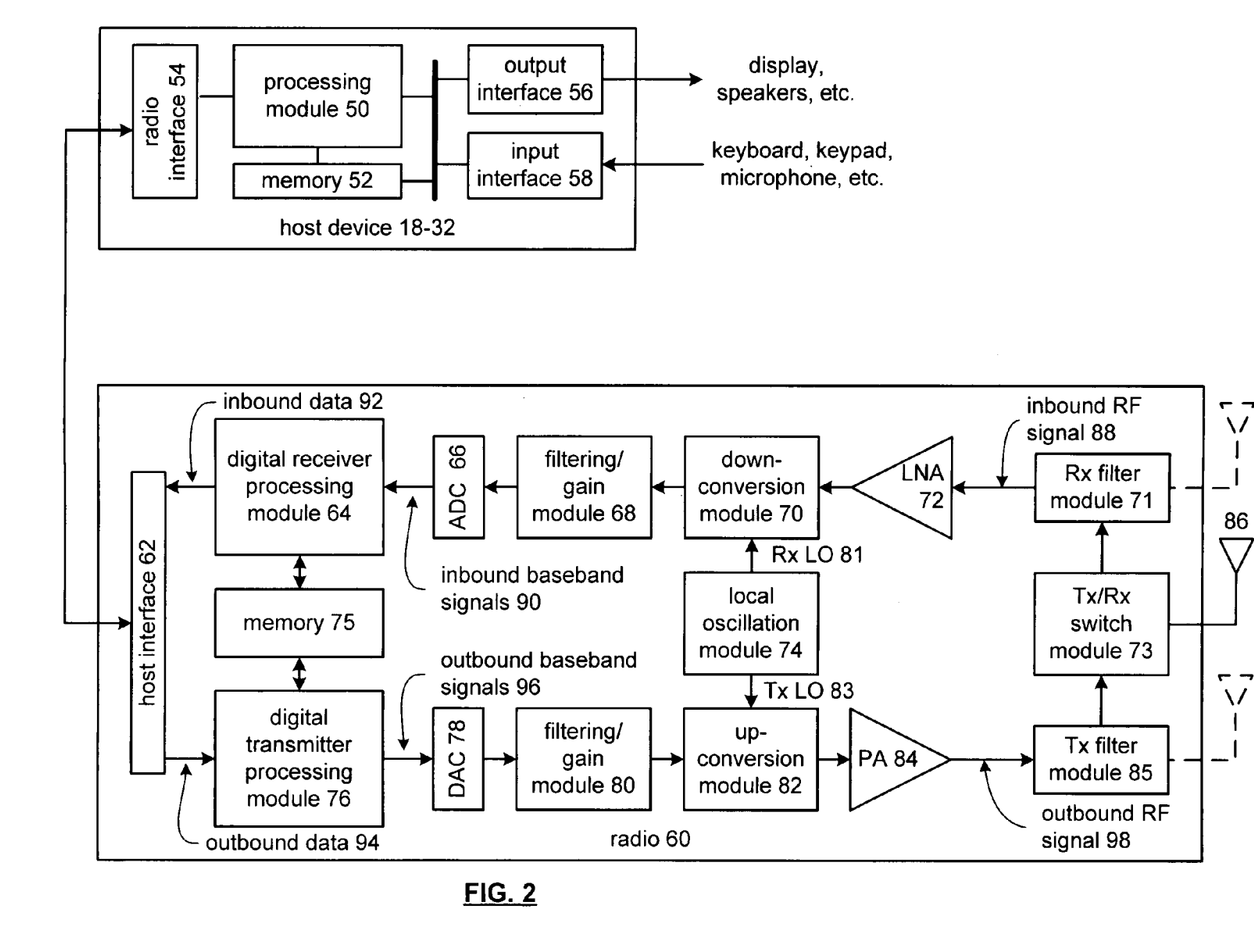
FIG. 2 is a schematic block diagram of a wireless communication device in accordance with the present invention.

FIG. 2 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, a radio interface 54, an input interface 58, and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11, Bluetooth, et cetera) to produce outbound baseband signals 96. The outbound baseband signals 96 will be digital base-band signals (e.g., have a zero IF) or a digital low IF signals, where the low IF typically will be in the frequency range of one hundred kilohertz to a few megahertz.

The digital-to-analog converter 78 converts the outbound baseband signals 96 from the digital domain to the analog domain. The filtering/gain module 80 filters and/or adjusts the gain of the analog signals prior to providing it to the IF mixing stage 82. The IF mixing stage 82 converts the analog baseband or low IF signals into RF signals based on a transmitter local oscillation 83 provided by local oscillation module 74. The power amplifier 84 amplifies the RF signals to produce outbound RF signals 98, which are filtered by the transmitter filter module 85. The antenna 86 transmits the outbound RF signals 98 to a targeted device such as a base station, an access point and/or another wireless communication device.

The radio 60 also receives inbound RF signals 88 via the antenna 86, which were transmitted by a base station, an access point, or another wireless communication device. The antenna 86 provides the inbound RF signals 88 to the receiver filter module 71 via the Tx/Rx switch 73, where the Rx filter 71 bandpass filters the inbound RF signals 88. The Rx filter 71 provides the filtered RF signals to low noise amplifier 72, which amplifies the signals 88 to produce an amplified inbound RF signals. The low noise amplifier 72 provides the amplified inbound RF signals to the IF mixing module 70, which directly converts the amplified inbound RF signals into an inbound low IF signals or baseband signals based on an receiver local oscillation 81 provided by local oscillation module 74. The down conversion module 70 provides the inbound low IF signals or baseband signals to the filtering/gain module 68. The filtering/gain module 68 filters and/or gains the inbound low IF signals or the inbound baseband signals to produce filtered inbound signals.

The analog-to-digital converter 66 converts the filtered inbound signals from the analog domain to the digital domain to produce inbound baseband signals 90, where the inbound baseband signals 90 will be digital base-band signals or digital low IF signals, where the low IF typically will be in the frequency range of one hundred kilohertz to a few megahertz. The digital receiver processing module 64 decodes, descrambles, demaps, and/or demodulates the inbound baseband signals 90 to recapture inbound data 92 in accordance with the particular wireless communication standard being implemented by radio 60. The host interface 62 provides the recaptured inbound data 92 to the host device 18–32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
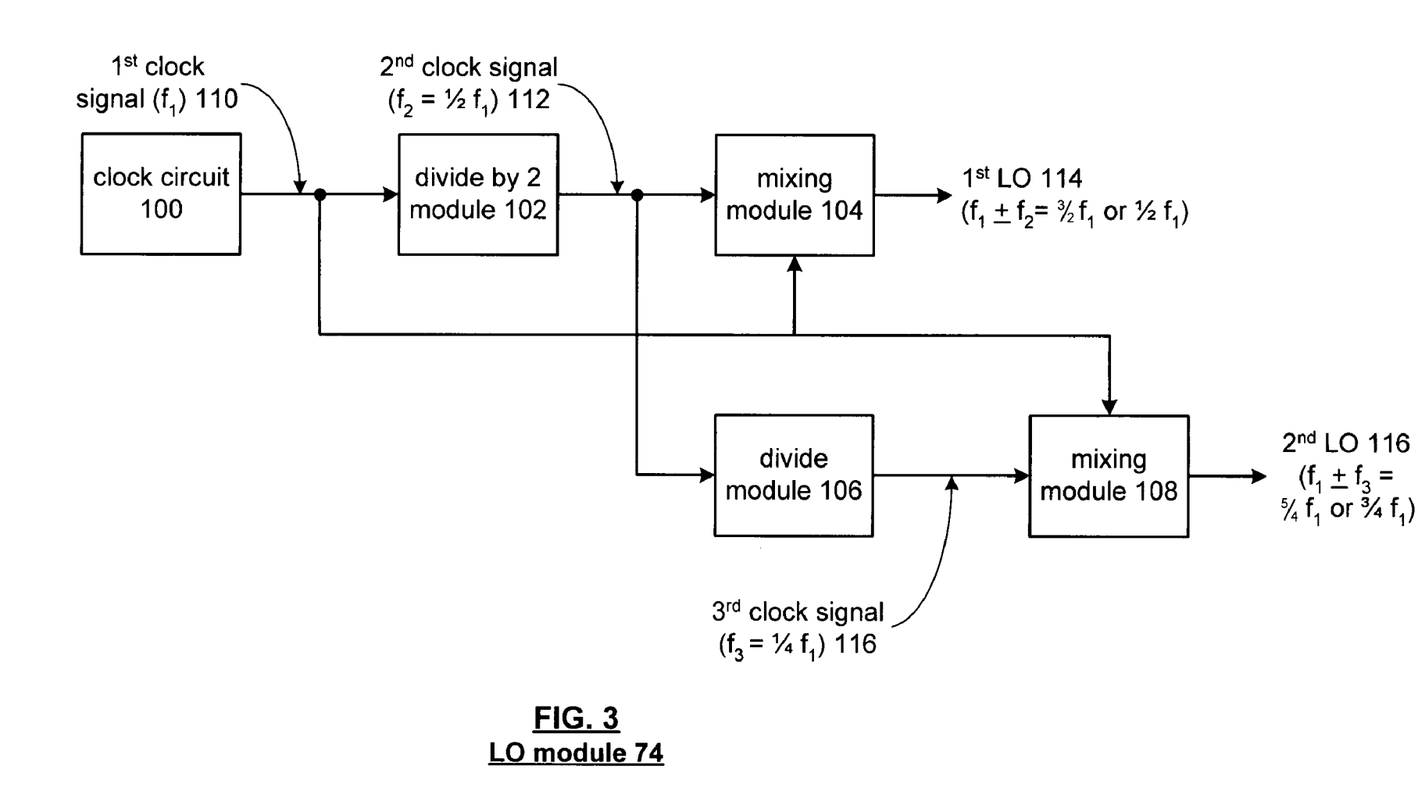
FIG. 3 is a schematic block diagram of an embodiment of a local oscillation module in accordance with the present invention.

FIG. 3 is a schematic block diagram of a local oscillation module, or generator, 74 that includes a clock circuit 100, a divide module 102, a mixing module 104, a $2^{nd}$ divide module 106 and a mixing module 108. The clock circuit 100, which may be a phase locked loop, produces a $1^{st}$ clock signal 100 that has a rate corresponding to frequency f1.

The clock circuit 100 provides the $1^{st}$ clock signal 110 to the $1^{st}$ divide module 102, the mixing module 104, and the mixing module 108. The divide module 102, which may be a divide-by-two module or a divide-by-x module, where x ranges from 0.1–16.0, produces a $2^{nd}$ clock signal 112, which has a rate corresponding to frequency f2. If the divide module 102 is a divide-by-two module, the rate of the $2^{nd}$ clock equals one-half the rate of the $1^{st}$ clock.

Mixing module 104 mixes the $1^{st}$ clock signal 110 with the $2^{nd}$ clock signal 112 to produce a $1^{st}$ local oscillation 114. The $1^{st}$ local oscillation may have a rate corresponding to the sum or difference of the rate of the $1^{st}$ and $2^{nd}$ clocks 110 and 112. As such, if the divide module 102 is at divide-by-two module, the $1^{st}$ local oscillation 114 may be three-halves the rate of the $1^{st}$ clock signal 110 or one-half the rate of the $1^{st}$ clock signal 110. In a preferred embodiment, the mixing module 104 would include a band-pass filter to pass either the sum or difference of the rates of the $1^{st}$ and $2^{nd}$ clock signals.

The divide module 106, which may be a divide-by-two module or a divide-by-z module, divides the $2^{nd}$ clock signal 112 to produce a $3^{rd}$ clock signal 116. If, for example, the $2^{nd}$ divide module 106 is a divide-by-two module, the $3^{rd}$ clock signal 116 has one-half the rate of the $2^{nd}$ clock signal 112 and, if the divide module 102 is a divide-by-two module, the $3^{rd}$ clock signal has one-quarter the rate of the $1^{st}$ clock signal 110.

The mixing module 108 mixes the $3^{rd}$ clock signal 116 with the $1^{st}$ clock signal 110 to produce a $2^{nd}$ local oscillation 118. The $2^{nd}$ local oscillation 118 may have a rate corresponding to the sum or difference of the rate of the $1^{st}$ and $3^{rd}$ clock signals 110 and 116. If the $1^{st}$ and $2^{nd}$ divide modules 102 and 106 are divide-by-two modules, the rate of the $2^{nd}$ local oscillation 118 may be 5/4ths the rate of the $1^{st}$ clock signal 110 or 3/4ths of the rate of the $1^{st}$ clock signal 110. In an embodiment, the mixing module 108 includes a band-pass filter to pass either the sum or the difference of the $1^{st}$ and $3^{rd}$ clock signals 110 and 116.

In an embodiment, the local oscillation module 74 may be used in a multimode transceiver that is compliant with IEEE 802.11a, 802.11g, 802.11n, and extensions thereof, and is compliant with 802.11b and extensions thereof. The frequency bands for 802.11a, 802.11g and 802.11n correspond to approximately 5.25 GHz and 5.7 GHz, while the frequency band for 802.11b corresponds to approximately to 2.4 GHz. The local oscillation module 74 may be constructed in such a way to provide the clock rates as shown in the corresponding table.

Figure 4:
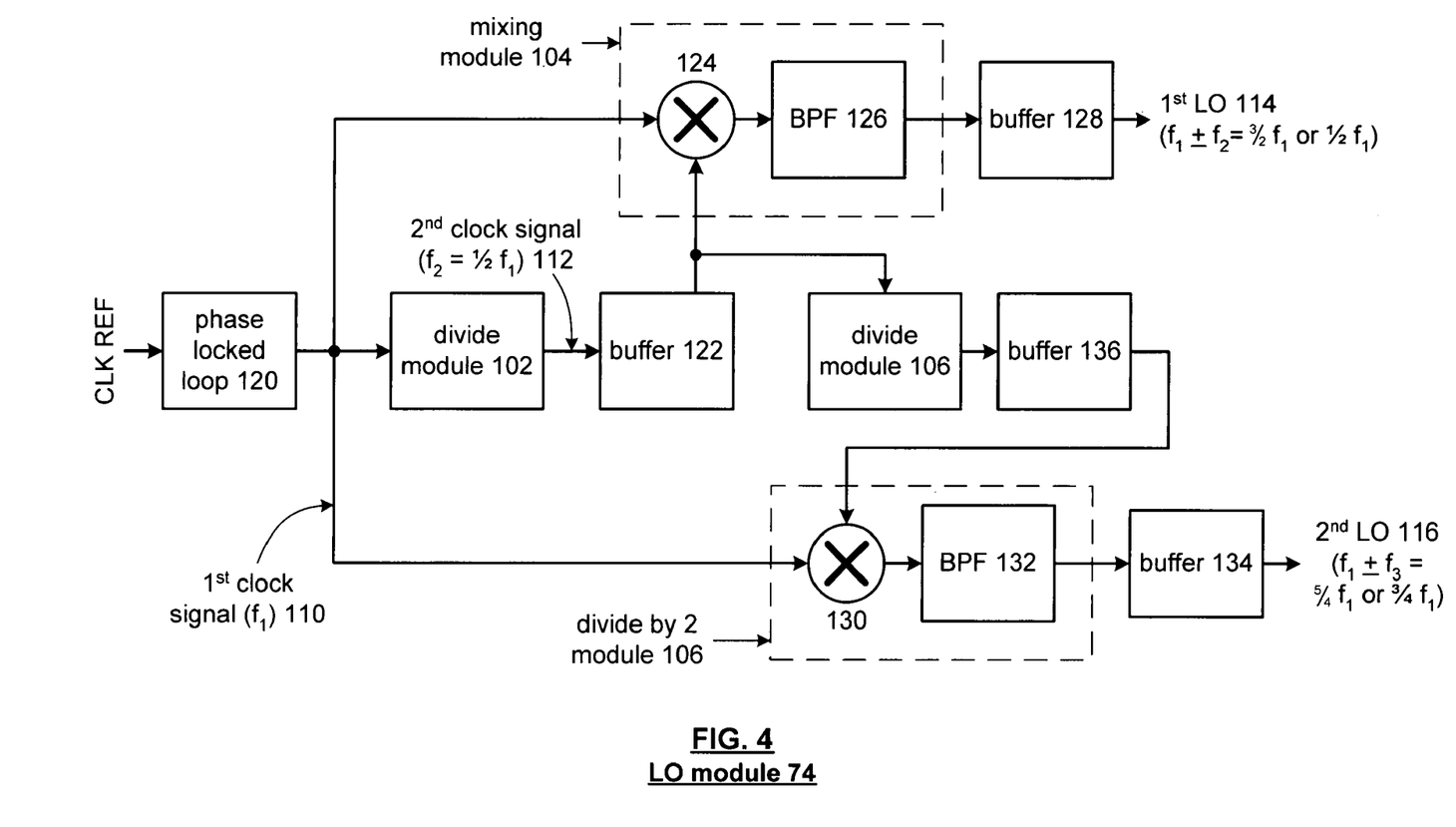
FIG. 4 is a schematic block diagram of another embodiment of a local oscillation module in accordance with the present invention.

In operation, the phase locked loop 120 produces the $1^{st}$ clock signal 110 from a clock reference. The divide module 102 divides the $1^{st}$ clock signal by a $1^{st}$ factor (e.g., by a factor of 2) to produce a $2^{nd}$ clock signal 112, which is buffered via buffer 122. The mixer 124 mixes the $1^{st}$ clock signal 110 with the $2^{nd}$ clock signal 112 to produce a mixed clock signal. The band-pass filter 126 allows either the sum or the difference of the mixed signal to be passed as the $1^{st}$ local oscillation 114, which is buffered via buffer 128.

Divide module 106, which may be a divide-by-two module, divides the $2^{nd}$ clock signal 112 to produce a $3^{rd}$ clock signal that is stored in buffer 136. Mixer 130 mixes the $3^{rd}$ clock signal with the $1^{st}$ clock signal 110 to produce a mixed clock signal corresponding to the sum and difference of the rates of the $1^{st}$ and $3^{rd}$ clock signals. The band-pass filter 132 passes either the sum or the difference of the rate of the $1^{st}$ and $3^{rd}$ signals as the $2^{nd}$ local oscillation 118 that is buffered via buffer 132. Note that the mixers 124 and 130 may be tuned such that they substantially produce only the sum or the differences of the rates of the corresponding input clock. In such an embodiment, the band-pass filters 126 and 132 would be effectively implemented within the mixers 124 and 130.

Figure 5:
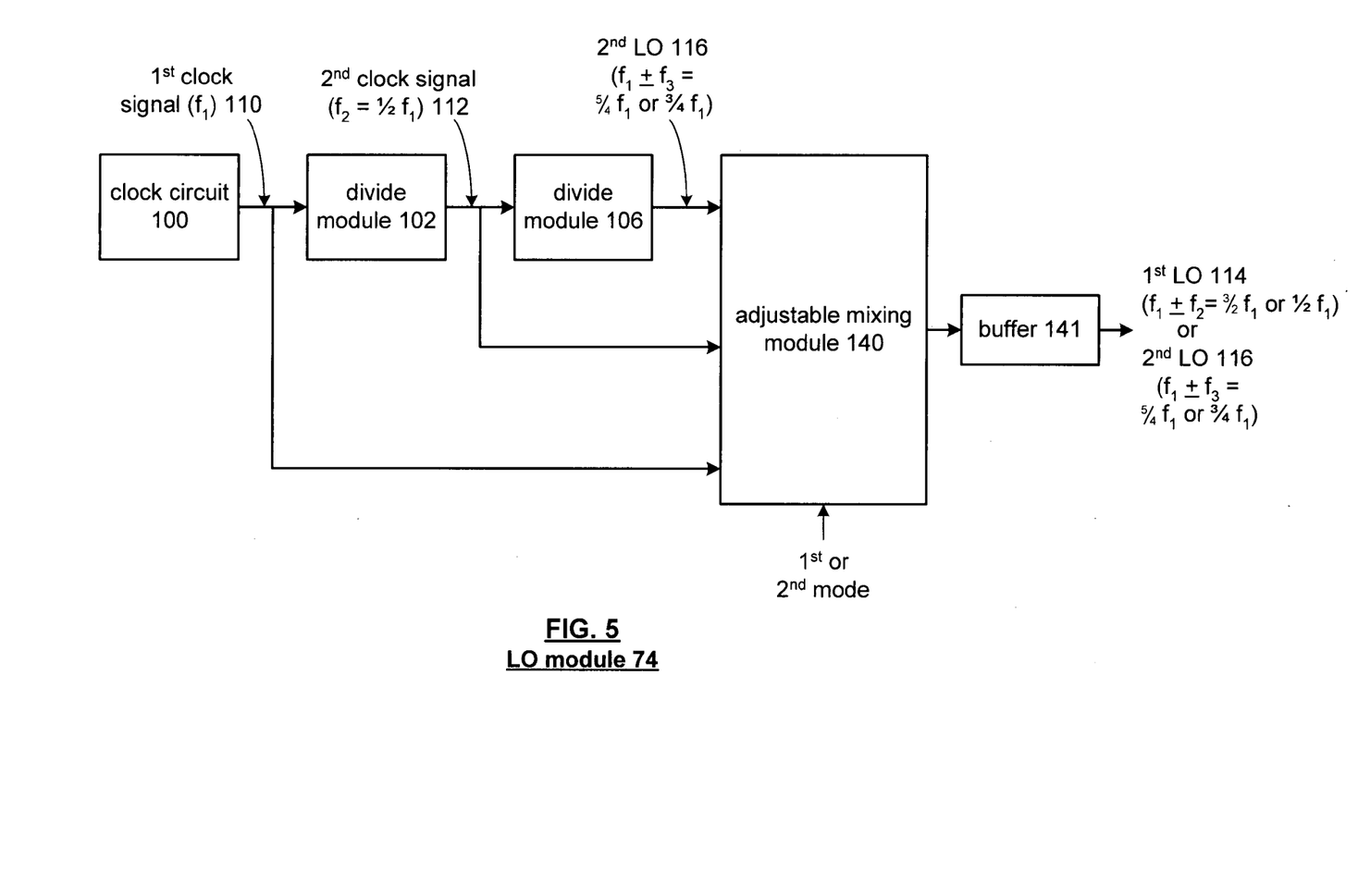
FIG. 5 is a schematic block diagram of yet another embodiment of a local oscillation module in accordance with the present invention.

FIG. 5 is a schematic block diagram of another embodiment of a local oscillation module, or generator, 74 that includes the clock circuit 100, divide module 102, divide module 106, an adjustable mixing module 140, and optional buffer 141. As shown, the clock circuit 100, which may be a phase locked loop, produces the $1^{st}$ clock signal, the $1^{st}$

TABLE

| $1^{st}$ clock | $2^{nd}$ clock | $3^{rd}$ clock | $1^{st}$ LO | $2^{nd}$ LO |
|---|---|---|---|---|
| 3.2 GHz | 1.6 GHz | 0.8 GHz | 4.8 or 1.6 GHz | 4.0 or 2.4 GHz |
| 3.5 GHz | 1.75 GHz | 0.875 GHz | 5.25 or 1.75 GHz | 4.375 or 2.625 GHz |
| 3.9 GHz | 1.8 GHz | 0.9 GHz | 5.7 or 1.8 GHz | 4.8 or 3 GHz |

For instance, the clock circuit 100 may be a phase locked loop that is adjustable to produce a $1^{st}$ clock signal 110 that ranges in frequency from 3.2 GHz to 3.9 GHz. As shown in the table, when the $1^{st}$ clock signal is set for 3.2 GHz, the $2^{nd}$ clock signal is 1.6 GHz and the $3^{rd}$ clock signal is 0.8 GHz. In this instance, the $1^{st}$ local oscillation is either 4.8 or 1.6 GHz and the $2^{nd}$ local oscillation is 4.0 or 2.4 GHz. For an IEEE 802.11b application, which utilizes a 2.4 GHz local oscillation, the 2.4 GHz produced by the $2^{nd}$ would be used.

If the $1^{st}$ clock signal 100 is adjusted to a rate of 3.5 GHz, the $2^{nd}$ clock is 1.75 GHz and the $3^{rd}$ clock is 0.875 GHz. With these clock signals, the $1^{st}$ local oscillation is a clock signal that has a rate of either 5.25 GHz or 1.75 GHz and the $2^{nd}$ local oscillation has a rate of either 4.375 GHz or 2.625 GHz. For an 802.11a application in the 5.25 GHz range, the $1^{st}$ local oscillation would be utilized wherein mixing module 104 would include a band-pass filter to select the 5.25 GHz rate clock signal. A similar concept applies for obtaining a 5.75 GHz local oscillation for the 5.75 GHz frequency band by setting the $1^{st}$ clock to 3.9 GHz.

FIG. 4 is a schematic block diagram of another embodiment of the local oscillation module, or generator, 74. In this embodiment, the local oscillation module 74 includes a phase locked loop 120, divide module 102, a buffer 122, the $1^{st}$ mixing module 104, the $2^{nd}$ divide module 106, buffer 136, the $2^{nd}$ mixed module 106, and buffers 128 and 134. Each of the mixing modules 104 and 106 include a mixer 124 or 130 and a band-pass filter 126 or 132.

divide module 102 produces a $2^{nd}$ clock signal 112 and the $2^{nd}$ divide module 106 produces a $3^{rd}$ clock signal 116.

The adjustable mixing module 140, in a $1^{st}$ mode of operation mixes the $1^{st}$ and $2^{nd}$ clock signals 110 and 112 to produce the $1^{st}$ local oscillation 114. In a $2^{nd}$ mode, the adjustable mixing module 140 mixes the $2^{nd}$ clock signal 112 and the $3^{rd}$ clock signal 116 to produce the $2^{nd}$ local oscillation 118.

Figures 6, 7:
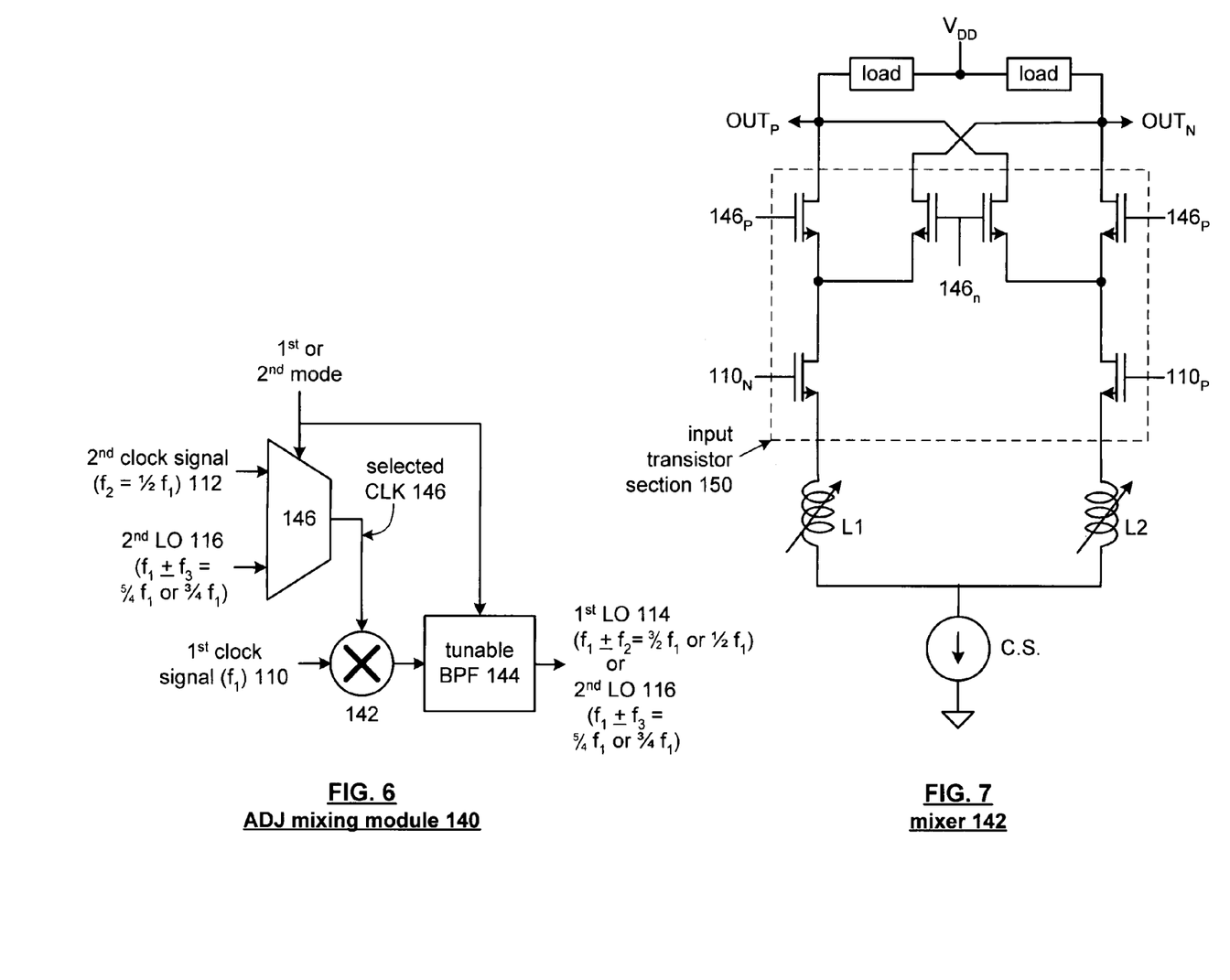
FIG. 6 is a schematic block diagram of an adjustable mixing module in accordance with the present invention.
FIG. 7 is a schematic block diagram of a mixer in accordance with the present invention.

FIG. 6 is a schematic block diagram of the adjustable mixing module 140 that includes a multiplexer 146, a mixing 142, and a tunable band-pass filter 144. The multiplexer 146 receives the $2^{nd}$ and $3^{rd}$ clock signals 112 and 116 as its inputs and, based on the $1^{st}$ or $2^{nd}$ mode of operation, outputs one of the clock signals as a selected clock signal 146.

The mixing module 142 mixes the $1^{st}$ clock signal 110 with the selected clock signal 146 to produce a mixed clock signal that has a sum of frequencies component and a difference of frequencies component. The tunable band-pass filter 144 is selected to pass either the sum or difference of frequencies of the mixed signal as the $1^{st}$ or $2^{nd}$ local oscillation 114 or 118.

FIG. 7 is a schematic block diagram of mixer 142 that is adjustable based on the different rates of the signals it is mixing. As shown, mixer 142 includes a pair of adjustable inductors L1 and L2, a current source CS, an input transistor section 150, and may further include load components (e.g., resistors, inductors, capacitors, etc.). The input transistor section 150 includes a plurality of transistors coupled as shown. Depending on the corresponding desired local oscillation output, the inductors L1 and L2 are tuned to provide a desired appropriate frequency response for the selected local oscillation such that the resulting local oscillation has minimal attenuation.

Figure 8:
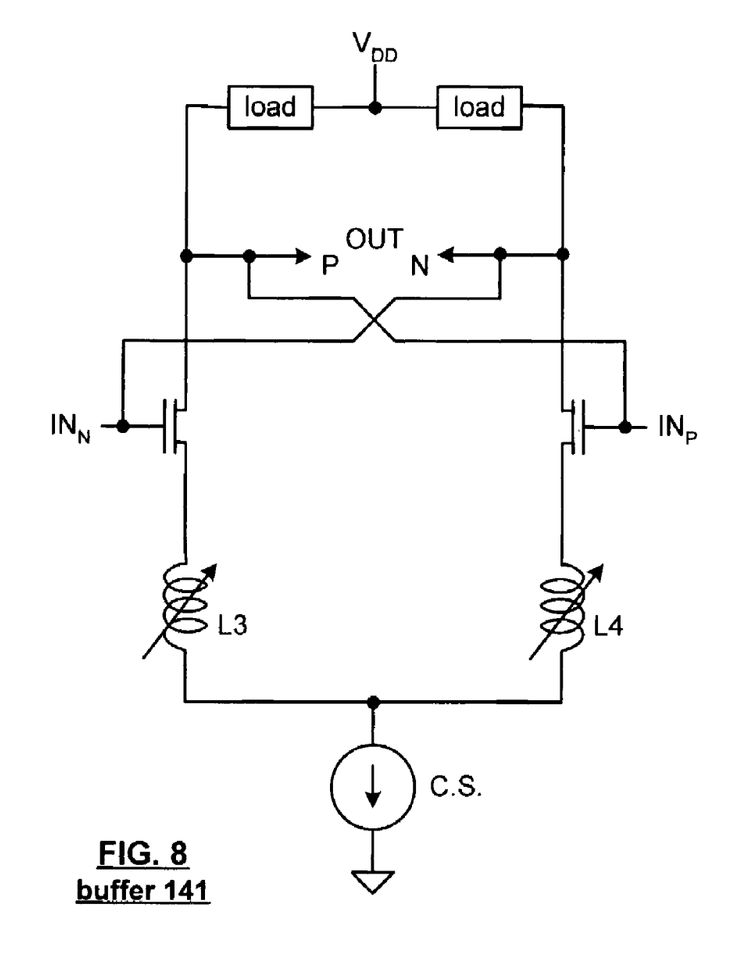
FIG. 8 is a schematic block diagram of an adjustable buffer in accordance with the present invention.

FIG. 8 is a schematic block diagram of the optional buffer 141, which is adjustable. In general, the buffer 141 is a unity gain amplifier that includes adjustable inductors L3 and L4, input transistors, and load components. Depending on the rate of the local oscillation 114 or 118, the inductors L3 and L4 are adjusted to provide the appropriate frequency response for buffer 141 such that the resulting local oscillation has minimal attenuation.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for a local oscillation generator to produce multiple local oscillations for different wireless communication standards. As one of average skill in the art will appreciate, other embodiments may be derived from the teaching of the present invention without deviating from the scope of the claims.

What is claimed is:

1. A local oscillation generator comprises:
a clock circuit to generate a first clock signal;
a first divide module operably coupled to divide rate of the first clock signal by a first factor to produce a second clock signal;
a first mixing module operably coupled to mix the first clock signal and the second clock signal to produce a first local oscillation;
a second divide module operably coupled to divide rate of the second clock signal by a second factor to produce a third clock signal; and
a second mixing module operably coupled to mix the first clock signal and the third clock signal to produce a second local oscillation.

2. The local oscillation generator of claim 1, wherein the clock circuit comprises:
an adjustable phase locked loop.

3. The local oscillation generator of claim 1 further comprises:
a first buffer operably coupled to buffer the first local oscillation; and
a second buffer operably coupled to buffer the second local oscillation.

4. The local oscillation generator of claim 3 comprises:
the first local oscillation having a frequency range of 4.92 GHz to 5.9 GHz; and
the second local oscillation having a frequency range of 2.41 GHz to 2.48 GHz.

5. A local oscillation generator comprises:
a clock circuit to generate a first clock signal;
a first divide module operably coupled to divide rate of the first clock signal by a first factor to produce a second clock signal;
a second divide module operably coupled to divide rate of the second clock signal by a second factor to produce a third clock signal; and
an adjustable mixing module operably coupled to mix the first clock signal and the second clock signal to produce a first local oscillation in a first mode of the adjustable mixing module and to mix the first clock signal and the third clock signal to produce a second local oscillation in a second mode of the adjustable mixing module.

6. The local oscillation generator of claim 5, wherein the adjustable mixing module comprises:
a first adjustable inductor having a first node and a second node;
a second adjustable inductor having a first node and a second node;
a current source operably coupled to a circuit ground, to the second node of the first adjustable inductor, and to the second node of the second inductor;
a first input transistor section operably coupled to the first nodes of the first and second adjustable inductors and to receive the first clock signal; and
a second input transistor section operably coupled to the first input transistor section and to receive the second clock signal or to receive the third clock signal.

7. The local oscillation generator of claim 5 further comprises:
a buffer operably coupled to buffer the first local oscillation or the second local oscillation.

8. The local oscillation generator of claim 7, wherein the buffer comprises:
a first adjustable inductor having a first node and a second node;
a second adjustable inductor having a first node and a second node;
a current source operably coupled to a circuit ground, to the second node of the first adjustable inductor, and to the second node of the second inductor; and
an input transistor section operably coupled to the first nodes of the first and second adjustable inductors and to receive the first or second local oscillation.

9. The local oscillation generator of claim 8 comprises:
the first local oscillation having a frequency range of 4.92 GHz to 5.9 GHz; and
the second local oscillation having a frequency range of 2.41 GHz to 2.48 GHz.

10. The local oscillation generator of claim 5, wherein the clock circuit comprises:
an adjustable phase locked loop.

11. A radio frequency integrated circuit (RFIC) comprises:

a transmitter section operably coupled to convert outbound data into outbound radio frequency (RF) signals based on a transmit local oscillation;

a receiver section operably coupled to convert inbound RF signals into inbound data based on a receive local oscillation; and a local oscillation generator that includes:

a clock circuit to generate a first clock signal;

a first divide module operably coupled to divide rate of the first clock signal by a first factor to produce a second clock signal;

a first mixing module operably coupled to mix the first clock signal and the second clock signal to produce a first local oscillation;

a second divide module operably coupled to divide rate of the second clock signal by a second factor to produce a third clock signal; and a second mixing module operably coupled to mix the first clock signal and the third clock signal to produce a second local oscillation, wherein the first local oscillation or the second local oscillation provide the transmit and receive local oscillations.

12. The RFIC of claim 11, wherein the clock circuit comprises:

an adjustable phase locked loop.

13. The RFIC of claim 11, wherein the local oscillation generator further comprises:

a first buffer operably coupled to buffer the first local oscillation; and a second buffer operably coupled to buffer the second local oscillation.

14. The RFIC of claim 13 comprises:

the first local oscillation having a frequency range of 4.92 GHz to 5.9 GHz; and the second local oscillation having a frequency range of 2.41 GHz to 2.48 GHz.

15. A radio frequency integrated circuit (RFIC) comprises:

a transmitter section operably coupled to convert outbound data into outbound radio frequency (RF) signals based on a transmit local oscillation;

a receiver section operably coupled to convert inbound RF signals into inbound data based on a receive local oscillation; and a local oscillation generator that includes:

a clock circuit to generate a first clock signal;

a first divide module operably coupled to divide rate of the first clock signal by a first factor to produce a second clock signal;

a second divide module operably coupled to divide rate of the second clock signal by a second factor to produce a third clock signal; and an adjustable mixing module operably coupled to mix the first clock signal and the second clock signal to produce a first local oscillation in a first mode of the adjustable mixing module and to mix the first clock signal and the third clock signal to produce a second local oscillation in a second mode of the adjustable mixing module, wherein the first local oscillation or the second local oscillation provide the transmit and receive local oscillations.

16. The RFIC of claim 15, wherein the adjustable mixing module comprises:

a first adjustable inductor having a first node and a second node;

a second adjustable inductor having a first node and a second node;

a current source operably coupled to a circuit ground, to the second node of the first adjustable inductor, and to the second node of the second inductor;

a first input transistor section operably coupled to the first nodes of the first and second adjustable inductors and to receive the first clock signal; and a second input transistor section operably coupled to the first input transistor section and to receive the second clock signal or to receive the third clock signal.

17. The RFIC of claim 15, wherein the local oscillation generator further comprises:

a buffer operably coupled to buffer the first local oscillation or the second local oscillation.

18. The RFIC of claim 17, wherein the buffer comprises:

a first adjustable inductor having a first node and a second node;

a second adjustable inductor having a first node and a second node;

a current source operably coupled to a circuit ground, to the second node of the first adjustable inductor, and to the second node of the second inductor; and an input transistor section operably coupled to the first nodes of the first and second adjustable inductors and to receive the first or second local oscillation.

19. The RFIC of claim 18 comprises:

the first local oscillation having a frequency range of 4.92 GHz to 5.9 GHz; and the second local oscillation having a frequency range of 2.41 GHz to 2.48 GHz.

20. The RFIC of claim 15, wherein the clock circuit comprises:

an adjustable phase locked loop.

* * * * *